United States Patent [19]
Asp

[11] 3,908,773
[45] Sept. 30, 1975

[54] DEVICES FOR PROGRESSIVE THROTTLING TO COMPLETE SHUT-OFF OF THE DISCHARGE IN MACHINES FOR DISPENSING FLUIDIZABLE MATERIAL IN WEIGHT PORTIONS

[75] Inventor: Nils Asp, Svedala, Sweden

[73] Assignee: Svedala-Abra AB, Svedala, Sweden

[22] Filed: July 22, 1974

[21] Appl. No.: 490,741

[52] U.S. Cl. .................. 177/122; 177/123; 141/68; 141/128; 302/54; 222/193
[51] Int. Cl.² . G01G 13/02; B65B 1/16; B65B 1/34; B65G 53/40
[58] Field of Search .......... 177/122, 123, 160, 118; 141/68, 128; 302/53–55; 222/193, 556

[56] References Cited
UNITED STATES PATENTS

| | | | |
|---|---|---|---|
| 2,727,713 | 12/1955 | Kindseth et al. | 177/123 X |
| 3,366,190 | 1/1968 | Lau | 177/160 |
| 3,516,454 | 6/1970 | Smith | 141/68 |
| 3,572,401 | 3/1971 | Nelson et al. | 177/122 X |
| 3,589,458 | 6/1971 | Schwake et al. | 177/122 |

*Primary Examiner*—George H. Miller, Jr.
*Attorney, Agent, or Firm*—Paul D. Weaver

[57] ABSTRACT

This invention relates to a shut-off device for the outlet from a tank holding fluidizable material. The shut-off device comprises a plug placed inside the tank, and a weigher having an operating mechanism connected to the plug, the weigher being adapted, before a full weight portion is discharged through the outlet and the outlet is fully closed, to operate the plug via the operating mechanism to move the plug into a position in which the plug only partially closes the outlet.

12 Claims, 4 Drawing Figures

DEVICES FOR PROGRESSIVE THROTTLING TO COMPLETE SHUT-OFF OF THE DISCHARGE IN MACHINES FOR DISPENSING FLUIDIZABLE MATERIAL IN WEIGHT PORTIONS

This invention relates to a shut-off device for the material outlet from dispensing machines of the type comprising a tank holding fluidizable material, means for fluidizing fluidizable material in the tank and dispensing means for dispensing fluidizable material from the tank.

The general object of the invention is to provide a device for progressive throttling to complete shut-off of the discharge under conditions such that a satisfactory weighing accuracy and dust-free packaging are ensured.

A group of prior art dispensing or packing machines to which the present invention is applicable, are designed to bring about fluidization of the material being discharged.

In these machines the material is fluidized by means of air or other gas in a fluidizing chamber and expelled through a filling tube into a valve bag. The bag with the material is weighed and when the exact weight is obtained, the flow of material is shut off by means of a valve which consists of an elastically deformable tube, usually a rubber tube or sleeve which is compressed by means of air under pressure or by a pinching device of some kind, for instance a guillotine type device by means of which the rubber tube or sleeve is pinched from two opposite directions. The constructional weakness of these machines consistently resides in said device for shutting off the flow of the material being discharged.

Usually weighing can only be performed in a single phase when the flow of material is suddenly shut off. In cases of two-stage weighing a tube of smaller diameter must be introduced into the filling tube.

The rubber tube or sleeve connecting the fluidizing chamber and the filling tube may be damaged if hot material is dispensed. Material which is difficult to fluidize easily jams in the rubber sleeve and is retained therein. If relatively large pieces of material jam in the rubber sleeve when the flow of material is shut off, more fine-grained material may still penetrate past the point of shut-off and be expelled. Shut-off of a deformable tube of circular section (rubber tube, rubber sleeve, etc.) by pinching takes place relatively slowly during the major portion of the pinching operation, that is to say, the cross sectional area of the tube diminishes to a relatively insignificant extent up to the moment when the opposite sides of the tube wall are very close together.

This material shut-off device does not therefore permit a rapid and exact weighing of definite portions of material and is not very apt to provide a discharge of the material in two steps, that is, a rapid or bulk discharge followed by a dribble discharge of the material at the weighing operation. Moreover, this device gives rise to dust problems because the shut-off is not always sufficiently tight, in particular when relatively large particles of material jam at the point of shut-off so that fine particles of material, in particular dust particles, can get past the point of shut-off.

The present invention has for its object to eliminate these problems by providing a readily operable, reliable device which can be used in existing machines in conjunction with previously known shut-off devices to make two-stage weighing possible, that is bulk discharge and dribble discharge of the material at the weighing operation, or which can replace the previously known shut-off devices to make possible both two-stage weighing and tight rapid shut-off of the outlet when the discharge of the material being dispensed shall be interrupted.

These objects are attained by the present invention. To this end, the device for shutting off the outlet comprises a piston which is movably mounted in the tank holding the material to be dispensed and which is operable by an operating member, for instance an operating cylinder, for optionally partial or complete shut-off of the outlet from inside in one or more steps.

The piston can be operated via an arm pivotally mounted in the interior of the fluidizing chamber. Said piston may be a sealing plug possibly coated with a soft material. Alternatively, the outlet for the material can be made of soft material.

Weighing can be performed in two or more stages, with the use of this sealing plug. To this end, the mechanism for operating the piston (plug) can be so arranged as to be actuated by the weighing machine. The weighing machine can be equipped with an auxiliary balance beam for the dribble feed. At the first movement of the balance beam after the bulk weighing operation the mechanism is caused to push the piston towards the outlet opening so that the outlet is reduced, without being entirely closed, to allow a small flow of material to pass for the dribble feed and the dribble weighing operation which is completed when the balance beam has reached a state of equilibrium. The first pulse can also be set by means of a timer.

The communication between the tank of material and the filling tube can be established by means of a tube of steel or plastic or other material, which conically tapers towards the filling tube. As a result, material of high temperature can also be packaged, which is not permitted by the prior art devices having relatively coarse rubber sleeves. The tube is preferably movably suspended in order not to influence the sensitivity of the weighing machine to any appreciable extent, whereby a better weighing accuracy is attained. Besides, the sensitivity of the weighing machine is not influenced at the completion of the weighing operation, whereby the resulting weight can be indicated for instance by means of an associated pointer arrangement. This tube can also accommodate a tube for evacuating air recycled from the bag when filling is in progress.

In the shut-off piston (or plug) there may be provided a passage which is connected to a line conducting air under pressure and which permits blowing of air through the piston for blowing the filling tube 3 clean. This passage may, if desired, be connected to a vacuum line which sucks up remaining material in the filling tube and/or permits evacuation of excess air in the bag after filling has been completed, particularly if a tube for evacuation of recycled air is not utilized.

The device according to the present invention is capable of ensuring an effective evacuation of dust from the bag.

Embodiments of the invention will be more fully described hereinbelow and with reference to the accompanying drawings in which.

Figure 1:
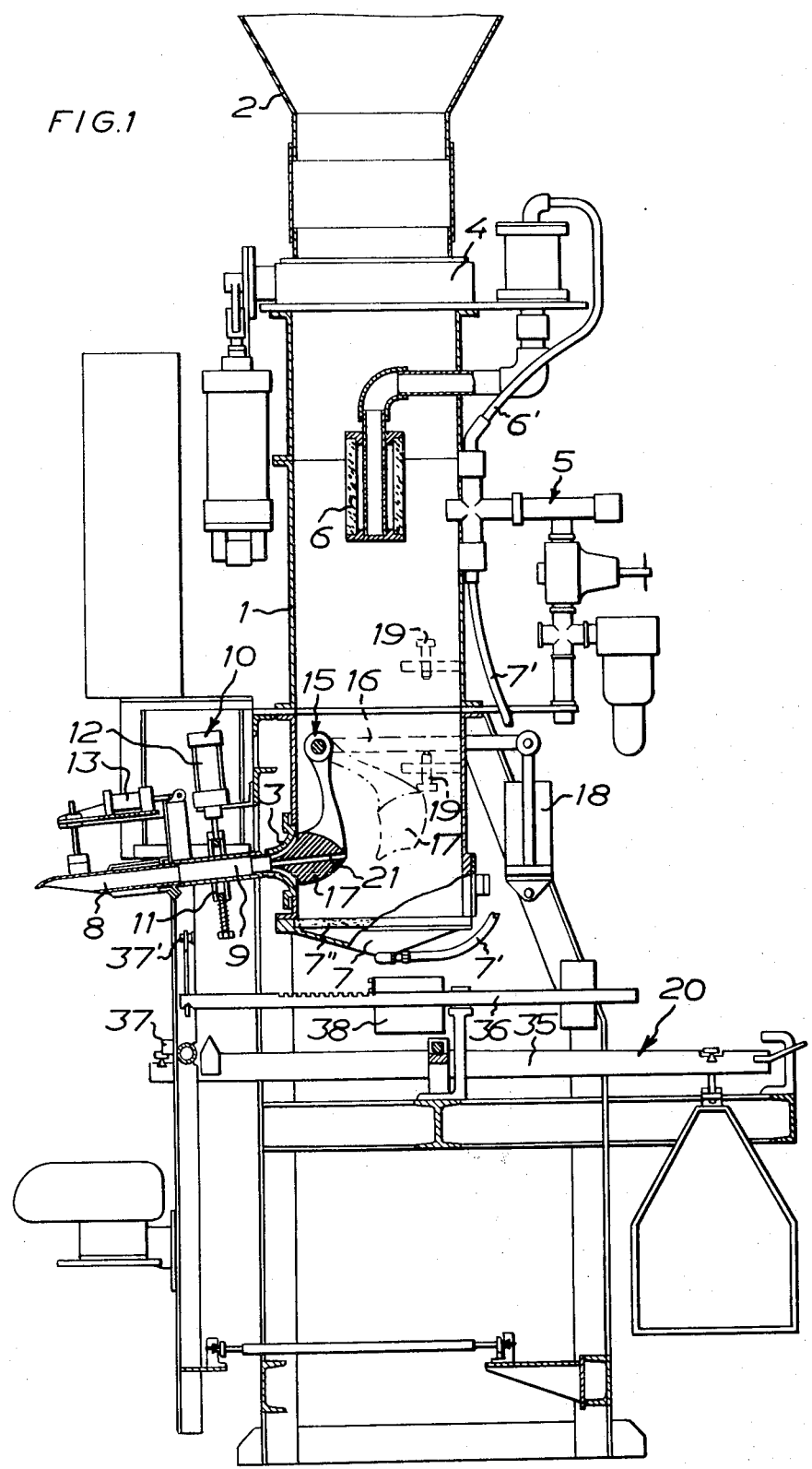
FIG. 1 is a vertical section of a filling machine equipped with a shut-off device according to the present invention.

FIG. 1 illustrates a filling machine of a per se known type, which comprises a tank 1 holding the material to be dispensed and to the upper end of which is connected a filling hopper 2 while an outlet 3 for the material is provided at the lower end of said tank. The tank 1 contains means for the fluidization of the material under pressure in the region between the bottom of the tank and a closable shutter at 4. The fluidization means include a compressed air supply system 5 with the requisite valves. Said system is connected by a pipe 6' to air injecting means 6 located in the middle portion of the tank 1 and having a porous wall, and by a pipe 7' to a fluidizing chamber 7 located in the lower portion of the tank and having a porous wall 7'' which constitutes the bottom wall of the tank. The outlet 3 is connected to a filling tube 8 of known construction via a rubber tube 9. The rubber tube 9 is pinchable by prior art pinching means generally designated 10 and including a guillotine type clamp 11 surrounding the rubber tube 9. The two movable parts of said clamp can be pressed against the tube 9 by operating means 12. The filling tube 8 is elastically carried by the rubber tube 9. A cylinder for clamping the upper end of a valve bag to the filling tube 8 is shown at 13. The described prior art device can be combined with or replaced by a shut-off device according to the present invention, which is generally designated 15 and comprises a closure plug 17 movably carried on a bell-crank 16 and shiftable by means of a pneumatic operating cylinder 18 or other suitable operating means connected to operate the bell-crank 16 for moving the plug to and from the illustrated position adjacent the outwardly conically tapering outlet 3 and a retracted position in which the closure plug is shown by dash and dot lines. These extreme positions can be adjusted by means of adjustable abutments shown as set screws 19 to restrict the possible pivotal movement of the bell-crank 16. The operation of the bell-crank 16 and the plug 17 by means of the cylinder 18 can be controlled by mechanical or electrical activating signals to the cylinder 18 from a weighing machine 20 which is used for weighing the material discharged into the abovementioned bag (not shown). If the plug 17 is to be used in combination with the pinching means 10 the plug can be so arranged as to be movable from the retracted position in a single step to a position in which it throttles, but does not fully close, the outlet 3 to permit dribble discharge of material after a rapid or bulk discharge. The final shut-off can then be effected with the aid of the pinching means 10. However, the shut-off device 15 according to the invention can also fully replace the pinching means 10, in which case the plug 17 shall also be capable of being brought to a fully closed position in sealing engagement with the outlet 3, which is very well possible by means of the embodiment illustrated.

The plug 17 can have a passage 21 for its connection to the air supply system 5 through an air line (not shown) for blowing the outlet 3 and the tube 8 clean or, alternatively, to a suction line for evacuation of excess air in the bag, sucking of remaining material into the filling tube 8 and possibly sucking of whirling dust into the bag and the tube 8.

Figure 2:
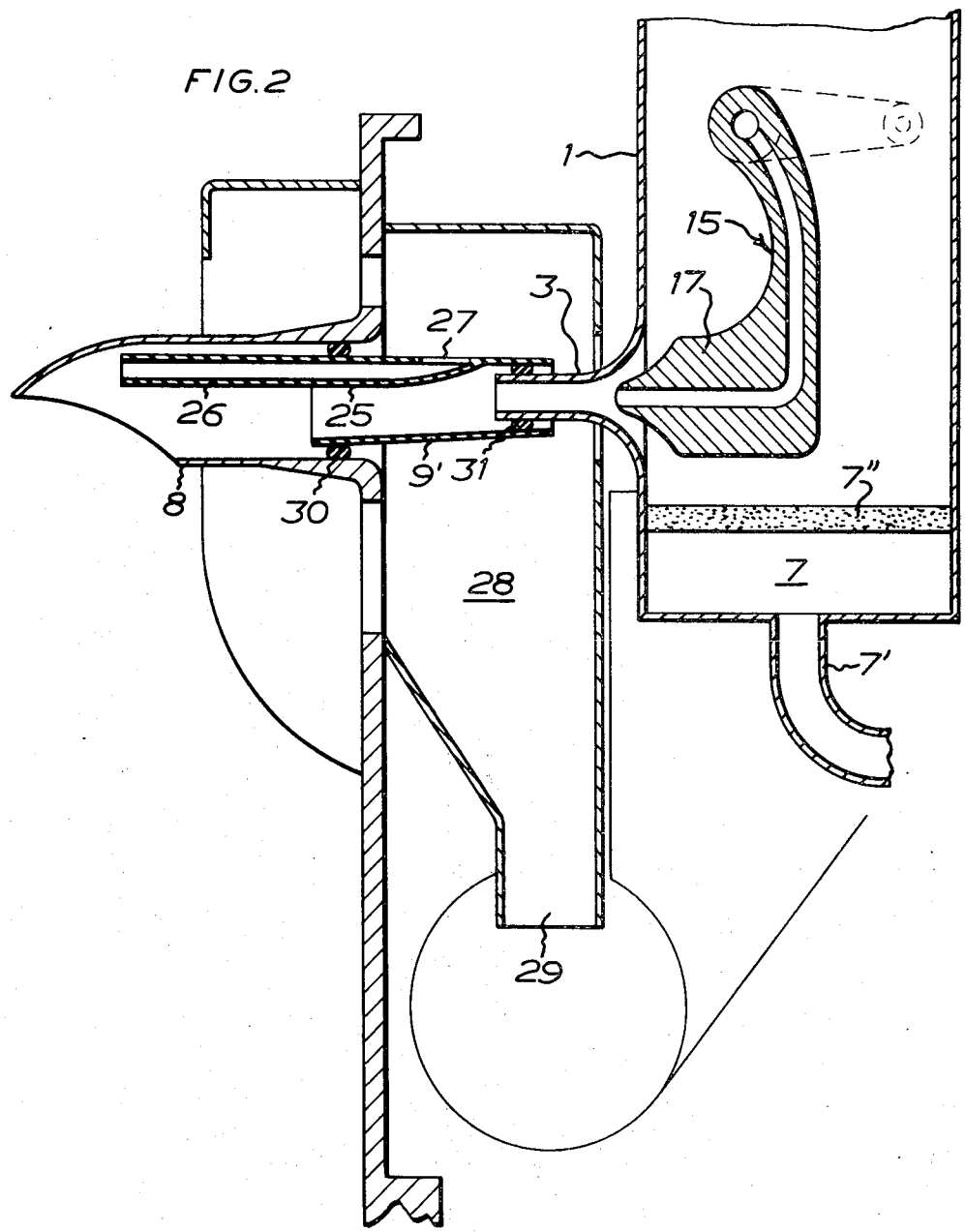
FIGS. 2, 3 and 4 are vertical sections of three modified embodiments of the device in FIG. 1.

FIG. 2 illustrates an embodiment in which the above described shut-off device 15 with the plug 17 inside the tank entirely replaces the prior art pinching means 10 in FIG. 1 and is operable for partially closing the outlet 3 to bring about dribble weighing and also for subsequent complete closing the outlet.

As in FIG. 1 the fluidizing chamber 7 shown in FIG. 2 in the lower part of the tank 1 under the porous wall 7'' is connected to an air supply system which is not shown in FIG. 2 but may be of the same construction as the air supply system 5 in FIG. 1. The outlet 3 is connected to a filling tube 8 via a tube 9'. In the tube 9' is formed a channel 25 which together with an elongated portion of the tube wall forms a nozzle 26. This nozzle 26 has its outer end extending into the filling tube 8. The inner end of the nozzle 26 communicates through an opening 27 in the wall of the tube 9' with a dust chamber 28 for permitting evacuation of air and dust into the chamber 28 from the tube 8 after filling a bag (not shown) with material from the tank 1 and before the bag is removed. The chamber 28 has an outlet at 29. In FIG. 2, 30 and 31 denote sealing rings between the tube 9' and the tube 8 and between the tube 9' and the outlet 3, respectively.

Figure 3:
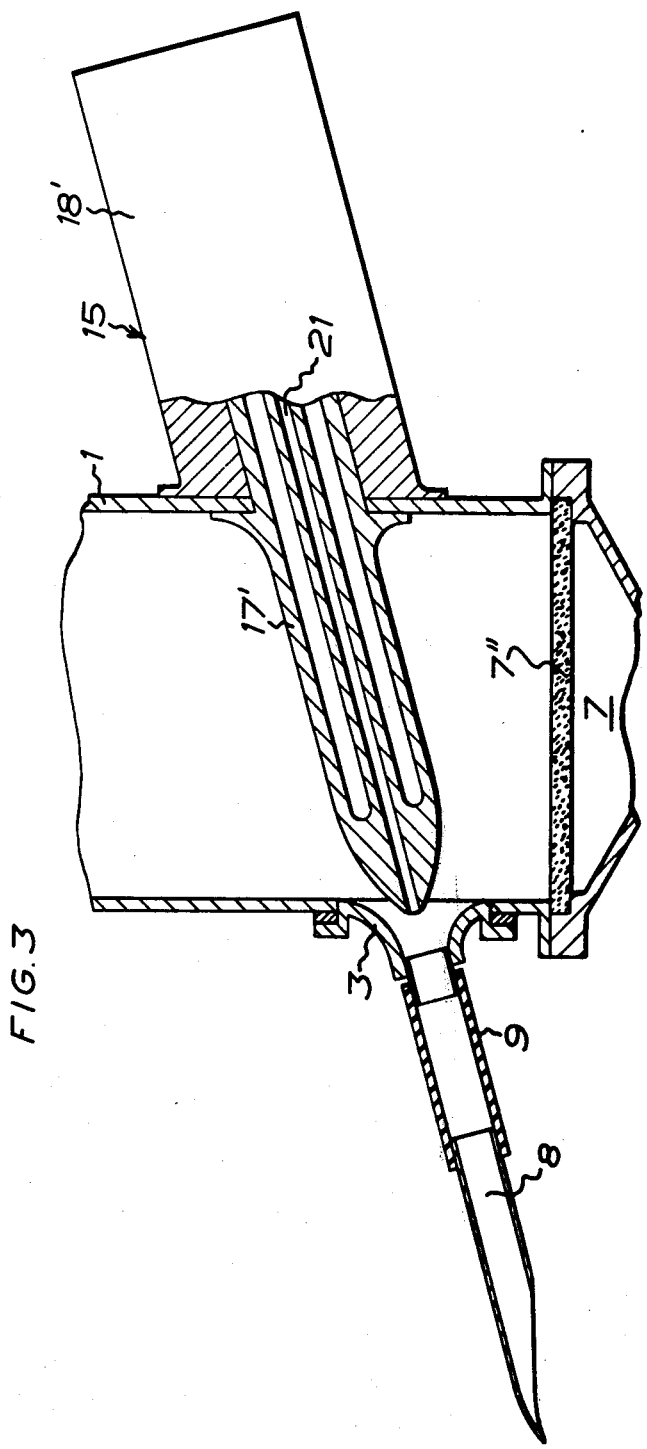

FIG. 3 shows a plug 17' which is slidably mounted in the tank 1 and is connected to the piston (not shown) in the operating cylinder 18' which is mounted on the outer side of the tank 1. Such reference numerals in FIG. 3 which have counterparts in FIG. 1 denote the same elements as in FIG. 1.

Figure 4:
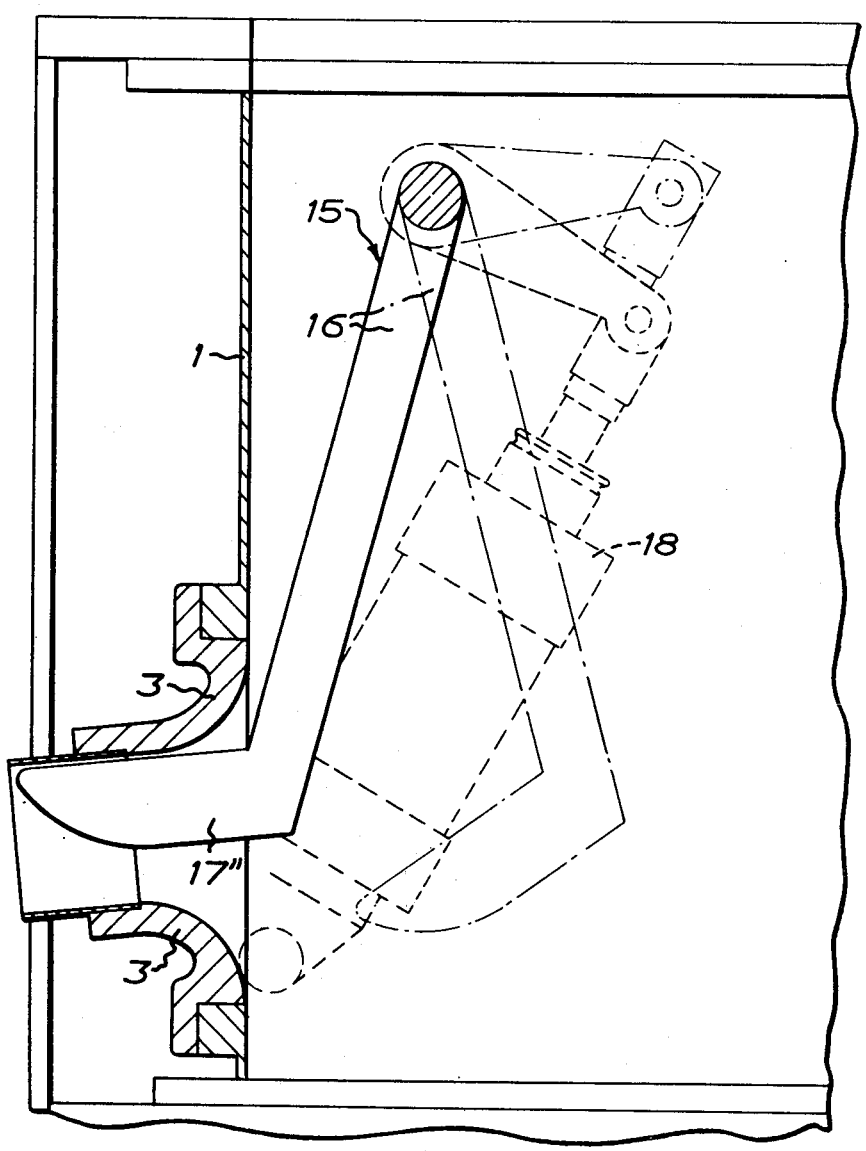

FIG. 4 shows a further modification in which the plug 17'' is only adapted to reduce the cross sectional area of the outlet 3 for bringing about dribble discharge and dribble weighing. The plug 17'' can be swung with the aid of a pneumatic cylinder 18 via the bell-crank 16 within the tank 1. Like in the other embodiments, the movement of the mechanism is not impeded by the material in the tank 1 since said material is kept in a fluidized state.

In all embodiments the plug 17 inside the tank 1 can be operated from a cylinder 18 placed on the outer side of the tank 1 and connected to the plug through an appropriate connecting means which is illustrated as a bell-crank 17 in FIG. 1, and the stroke of the piston in the cylinder may easily be adjusted from outside with the aid of the set screws 19 or any desired regulating means for controlling the degree of shutting of the outlet 3 and, as a consequence, for controlling the flow at the dribble discharge.

The activating pulses to the operating cylinder 18 for operating the plug 17 can be produced by pivotment of a main balance beam 35 in the weighing machine 20 in FIG. 1 or an auxiliary balance beam 36. When the main balance beam 35 or the auxiliary balance beam 36 reaches a predetermined position in a weighing cycle it activates the cylinder 18 via suitable means which, as mentioned only by way of example and as well known in the field of common control technique, may be a switch in a position as at 37 or 37' in FIG. 1 and connected to operate a solenoid valve (not shown) for connecting the cylinder 18 to the air supply system 5 in FIG. 1. The length of the dribble feed period can be regulated in such a way by means of a shiftable weight 38 that the movement of the balance beam 35 or 36 is initiated when the desired amount of material has been fed into the bag after bulk filling, for example 2—3 kg less than the final weight. According to another system, a spring (not shown) can be used to actuate the movement of the balance beam in a first stage.

Instead of a balance weigher use can be made of an electronic weighing machine. The mechanism 16, 18 operating the plug 17 should in that case be controlled electronically.

The invention is not restricted to the embodiments described above but can be modified in various ways within the spirit and scope of the invention.

What I claim as new and desire to secure by Letters Patent is:

1. A bag filling machine for dispensing fluidizable material in weight portions, said machine comprising a tank for holding fluidizable material, means for fluidizing fluidizable material in said tank, a material outlet from said tank, said outlet comprising an outlet tube in communication with and projecting from said tank, a shut-off device for shutting off a stream of material fed from said tank through said tube, a bag supporting means for supporting a bag outside said tank and in communication with said tube, a weigher connected to said bag supporting means for weighing material discharged from the tank through said tube into a bag supported by said supporting means, said weigher comprising an operating mechanism connecting said weigher to said shut-off device and adapted to be operated by said weigher and to operate said shut-off device to close said outlet when a weight portion preset by means of the weigher has been fed into said bag, wherein the shut-off device comprises a plug movably mounted inside the tank and connected to said operating mechanism, said plug being movable by said operating mechanism for movement into and back from said material outlet between a retracted open position and a partially closed position in which the plug leaves only part of the cross sectional area of the material outlet open to permit a restricted discharge of material, said weigher being preset to operate said operating mechanism for moving said plug to said partially closed position before a full weight portion is attained in said bag and, consequently, before the operation of said shut-off device to close said outlet.

2. A machine as claimed in claim 1, wherein said tube has at least one part made of elastic material and wherein said shut-off device for complete closing of said outlet comprises, further to said plug, a separate shut-off mechanism located outside the tank and having a pinching means for pinching said tube part made of elastic material.

3. A machine as claimed in claim 1, wherein said plug is made of soft material.

4. A machine as claimed in claim 1, wherein said plug is coated with soft material.

5. A machine as claimed in claim 1, wherein at least a portion of said outlet intended to cooperate with said plug is made of soft material.

6. A machine as claimed in claim 1, wherein said plug has a passage adapted to be connected to a line of air under pressure to permit blowing air through the plug for blowing the outlet for the material clean.

7. A machine as claimed in claim 1, wherein said plug has a passage adapted to be connected to a suction conduit to permit sucking the material remaining in the outlet through the plug back into said tank.

8. A machine as claimed in claim 1, wherein a dust chamber is arranged in communication with said outlet to permit evacuation of air and dust into said chamber from a bag at least during a final moment of the filling thereof.

9. A machine as claimed in claim 1, wherein said plug is formed with small openings, such as by forming the plug of porous material, in order to permit, after communication has been established with a source of air under pressure, fluidization of material that is discharged through the outlet, particularly in a moment when said outlet is partially closed by means of said plug.

10. A machine as claimed in claim 1, wherein said plug is movable from said partially closed position to a fully closed position in which the plug fully shuts said outlet and wherein said weigher is adapted to operate said operating mechanism to move said plug to said fully closed position when said full weight portion is attained.

11. A machine as claimed in claim 10 in which the weigher is a balance weighing machine with a balance beam, wherein the weigher comprises an auxiliary balance beam which is adapted, when said full weight portion has been attained, and, the balance beam reaches the state of equilibrium, to actuate the plug operating mechanism to cause said mechanism to move the plug to said closed position.

12. A machine as claimed in claim 10 in which the weigher is an electronic weighing machine, wherein the electric system of the weigher is connected to the plug operating mechanism and adapted to send separate operating signals to the operating mechanism for the partial and the complete closure of the outlet for the material.

* * * * *